C. F. SPERY.
GREASE CUP.
APPLICATION FILED APR. 2, 1917.
1,252,730.
Patented Jan. 8, 1918.
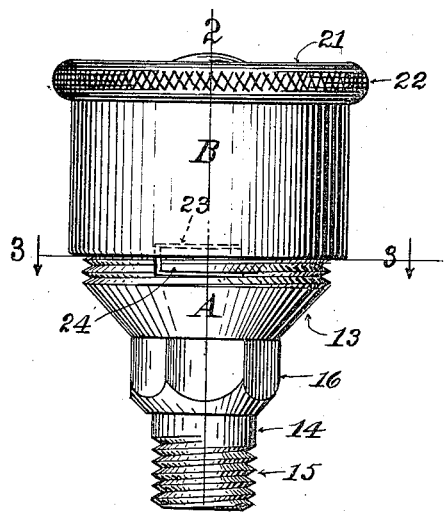
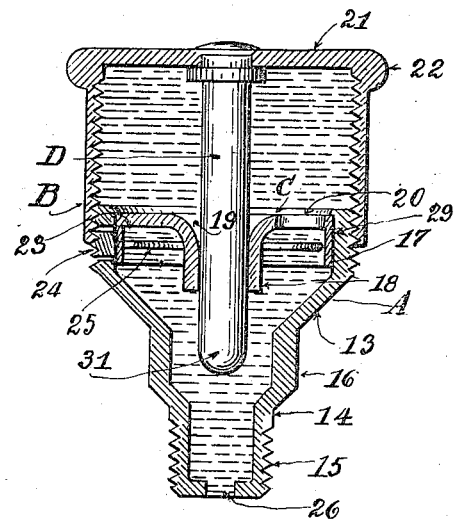
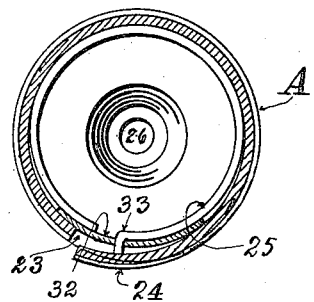
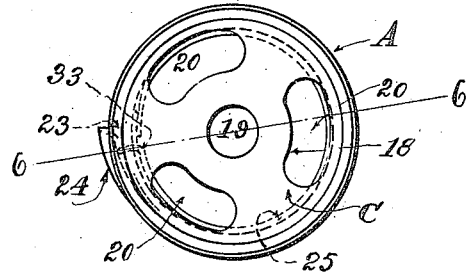
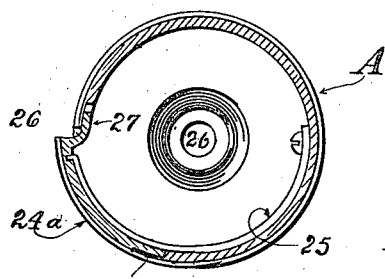
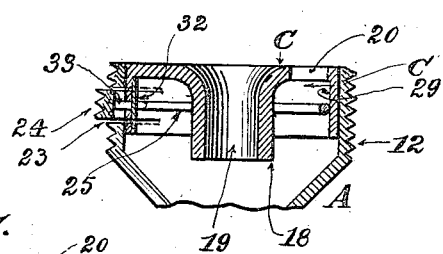
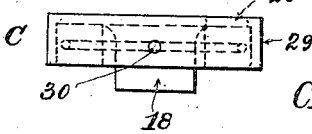
WITNESSES:
Al. Stark,
A. S. Peterson.
INVENTOR:
CHARLES F. SPERY,
BY Michael J. Stark & Sons
ATTORNEYS.

UNITED STATES PATENT OFFICE.

CHARLES F. SPERY, OF CHICAGO, ILLINOIS.

GREASE-CUP.

1,252,730. Specification of Letters Patent. Patented Jan. 8, 1918.

Application filed April 2, 1917. Serial No. 159,185.

*To all whom it may concern:*

Be it known that I, CHARLES F. SPERY, a citizen of the United States, and a resident of the city of Chicago, in the county of Cook and State of Illinois, have invented a certain new and useful Improvement in Grease-Cups; and I do hereby declare that the following description of my said invention, taken in connection with the accompanying sheet of drawing, forms a full, clear, and exact specification, which will enable others skilled in the art to which it appertains to make and use the same.

My invention relates generally to improvements in grease cups, and it consists, essentially, in the novel and peculiar combination of parts and details of construction, as hereinafter first fully set forth and described and then pointed out in the claims.

The object of this invention is the production of an efficient and highly serviceable grease cup for all kinds of machinery, motors, etc., wherewith are embodied frictionally operating means for preventing the cup containing the grease, from being jarred loose or to unscrew when subjected to vibration, and thereby be lost, especially when applied to motor vehicles. To accomplish these results, I construct this grease cup as illustrated in the drawings already referred to, in which Figure 1 is an elevation of my improved grease cup. Fig. 2 is a vertical sectional elevation of the same on line 2—2 of Fig. 1. Fig. 3 is a sectional view of the male part of this grease cup, drawn on line 3—3 of Fig. 1. Fig. 4 is a plan view of the male member detached. Fig. 5 is a sectional plan illustrating a modified construction of the male member. Fig. 6 is a sectional view of a fragment of this male member drawn on line 6—6 of Fig. 4. Fig. 7 is a detached view of the diaphragm.

A, in the drawings designates the male member of this grease cup. It is externally screw threaded at its upper extremity, as at 12, and is of flaring, or funnel shaped form, as at 13, and it terminates in a shank 14, the lower end of which is likewise externally screw threaded as at 15; there being a hexagonal section 16, on said shank for the application of a wrench by which the grease cup can be screwed to any part of a machine etc., where lubrication is required or desired.

Within the bore 17 at the upper end of the male member A, there is secured a diaphragm C, which has a centrally located, comparatively long, hub 18, which is centrally punctured, as at 19; and surrounding this hub there are a multiplicity of openings 20, which afford passages to the bore of the male part A. This diaphragm C, has a downwardly extending rim 29, in which there is an opening 30, the object of which will hereinafter appear.

B, is the cap, or female part of this grease cup. It serves as a container for the lubricant, and it is internally screw threaded to enter into engagement with the male thread at the upper end of the part A. In this cap B, there is centrally located a round rod or pin D, securely affixed in the bottom 21, of the cap, and extending downwardly for some distance beyond the lower margin of the cap B, it being pointed at its free end, as at 31, to facilitate its entry into the central aperture 19 in the boss 18. This boss or hub 19 with its aperture is quite deep, so that the pin D is perfectly steadied in this bore; and it being in axial alinement with the male part A, it follows that this pin guides the cap into correct position when being applied to the male part A, and thus prevents the crossing of the threads and the mutilation thereof, which is frequently the case where no guiding provisions are made for the engagement of the cap with the male body A.

In order to provide for effective means for handling the cap, I form thereon a projecting bead 22, which bead may be knurled or notched in the usual manner to secure a good grip on the cap.

In the wall of the upper extremity of the male part A, there is made a U-shaped cut or slit 23, and the portion of the wall defined by this U-shaped cut, is outwardly forced or bent, so that the exteriorly threaded portion 24 of this wall extends beyond the circumference of said wall from which it has been extended, forming, as it were, a tongue, and it is this portion 24 which affords the means for securely holding the cap B to the body A. To attain this result, the cap B, when being screwed onto the body A, will force this extended tongue 24 back; but it being resilient, it resists this forcing back and thereby impinges on the interior wall of the cap B with sufficient force to prevent any automatic unscrewing of the cap. And to increase this resistance of the part 24, a spring 25, is placed into the body A, to back up the part 24 in an obvious manner.

It will be noted that when the cap is filled with grease and it is being screwed onto the body A, the distance between the upper margin of the male part A and the bottom of the cap B decreases thereby forcing the lubricant through the holes 20 in the diaphragm C and the bore of the male part A out of the opening 26, at the lower terminal of the shank 14.

In the manufacture of the male part A, I prefer to shear the extended portion 24 out of the upper, screw threaded part 12 of the body A, in suitably constructed dies whereby the U-shaped slit 23 has practically no width, so that the tongue 24, when forced back to the original position before shearing, practically fits this U-shaped slit by a reasonably tight sliding fit. But to prevent the escape of grease through this slit, I secure to the inner wall of the rim 29, or in case where no diaphragm is being used, to the inner wall of the upper screw threaded part of the body A, a plate 32, in which, and in the rim 29, there is a small opening 30, through which the bent portion 33 of the spring 25 passes to bear against the back of the tongue 24. By this construction the U-shaped slit is covered and the escape of grease through this slit effectively prevented.

There is a demand for a comparatively cheap grease cup, which I can supply by a slight modification of the grease cup hereinbefore described, which result I attain by dispensing with the pilot pin D and the diaphragm C, but providing the male part A with the outwardly extended screw threaded part 24 the same as heretofore described, placing the plate 32 in position, and employing the spring 25 to back up the extended part, as clearly illustrated in Fig. 3.

The parts A and B are preferably made in the process of deep drawing in suitable dies, but the diaphragm C can be best produced in casting, and so can the part A be produced in the same process. But if the metal used in die casting is too soft to possess the required resiliency, I may form the tongue 24ª, separately and insert the same into an oblong hole 26, in the wall of the upper screw threaded portion of the male member A, as illustrated in Fig. 5 and apply the spring 25 to this inserted part. But to prevent this part 24ª from being pushed out of the hole 26 by the spring 25, I provide this part 24ª with lugs 27, at its ends which accomplishes the object in a satisfactory manner.

Attention is now directed to the fact that when the cap B is being screwed onto the male part A, and the lower edge of the cap reaches the extended portion 24, which as a matter of fact is an inclined plane, this lower edge moves on this inclined plane to force the extended part 24 inwardly. It follows that the screwing-on of the cap is comparatively easy and requires no effort to accomplish, while rotating the cap in the opposite, or unscrewing, direction, the cap meets with the full frictional resistance to the rotation of said cap, thereby holding the cap against accidental or automatic unscrewing, as heretofore described.

I have hereinbefore described the preferred embodiment of my invention, but I am aware that details of construction disclosed may be varied, and parts omitted without departing from the scope of my invention as defined in the subjoined claims.

Having thus fully described this invention, I claim as new and desire to secure to myself by Letters Patent of the United States—

1. As an improved article of manufacture, a grease cup, comprising a male part, and a female part, said parts being in screw threaded engagement with each other, there being in the screw threaded portion of the male part an outwardly extending movable tongue, said tongue being resilient, said tongue being a part of said screw threaded portion but severed therefrom and attached thereto at one end, whereby said tongue presses against the inner wall of the cap when the latter is in applied position to prevent automatic rotation of said cap by frictional contact therewith.

2. As an improved article of manufacture, a grease cup, comprising a male part, and a female part, said parts being in screw threaded engagement with each other, there being in the screw threaded portion of the male part an outwardly extended movable tongue, said tongue being resilient, whereby said tongue presses against the inner wall of the cap when the latter is in applied position, said tongue being sheared out of the upper portion of said male part, but attached to the same at one end.

3. As an improved article of manufacture, a grease cup, comprising a male and a female part, both parts being in screw-threaded engagement with each other, there being in the screw threaded portion of the male part an outwardly projecting, movable tongue, a perforated diaphragm in said male part at the upper extremity thereof, said diaphragm having a rim, there being in said rim a small aperture opposite the outwardly extended tongue, a spring in said diaphragm, said spring having one of its ends bent and passing through said aperture to press against said tongue.

4. As an improved article of manufacture, a grease cup, comprising a male and a female part, both parts being in screw threaded engagement with each other, there being in the screw threaded part of the male body a U-shaped slit, an outwardly extending tongue, said tongue being resilient, a plate behind said tongue to cover said slit, there being a small hole in said plate, and a spring in said male part, said spring having one of its ends bent to pass through said hole in the plate to press against said tongue, whereby said tongue presses against the inner wall of said cap when the latter is in applied position, to prevent automatic rotation of said cap.

5. As an improved article of manufacture, a grease cup, comprising a male body, a cap in screw threaded engagement with said male body, a diaphragm in the upper extremity of said male body, said diaphragm having a central passage surrounded by one or more openings, a pin extending centrally downwardly from said cap and engaging said central opening in said diaphragm, there being, outwardly projecting from the upper screw threaded part of said male body, a tongue, said tongue being resilient to press against the inner wall of said cap when the latter is in applied position.

6. As an improved article of manufacture, a grease cup, comprising a male body, a cap in screw threaded engagement with said male body, a diaphragm in the upper extremity of said male body, said diaphragm having a central tubular hub, there being one or more holes in said diaphragm surrounding said central hub, there being, outwardly projecting from the upper screw threaded portion of said male body, a tongue, said tongue being inwardly movable under force applied thereto, said tongue being constructed to press against the inner wall of said cap when the latter is in applied position, and a spring in said diaphragm constructed to reinforce the resistance of said tongue to inward movement.

7. As an improved article of manufacture, a grease cup, comprising a male part, and a female part, said parts being in screw threaded engagement with each other, there being in the screw threaded portion of the male part an outwardly extending movable tongue, the said tongue having its outer surface inclined to the periphery of the male part, said tongue being resilient, said tongue being a part of said screw threaded portion but severed therefrom and attached thereto at one end, and pressing against the inner wall of said cap when the latter is in applied position.

In testimony that I claim the foregoing as my invention, I have hereunto set my hand.

CHARLES F. SPERY.

Copies of this patent may be obtained for five cents each, by addressing the "Commissioner of Patents, Washington, D. C."